G. P. ALTENBERG.
CARAFE AND CASING THEREFOR.
APPLICATION FILED APR. 8, 1913.

1,218,036.

Patented Mar. 6, 1917.
2 SHEETS—SHEET 1.

Witnesses:
Jacob A. Hollander
Theresa M. Silber

Inventor:
George P. Altenberg
By R. H. Herbslet
His Attorney

G. P. ALTENBERG.
CARAFE AND CASING THEREFOR.
APPLICATION FILED APR. 8, 1913.
1,218,036.
Patented Mar. 6, 1917.
2 SHEETS—SHEET 2.
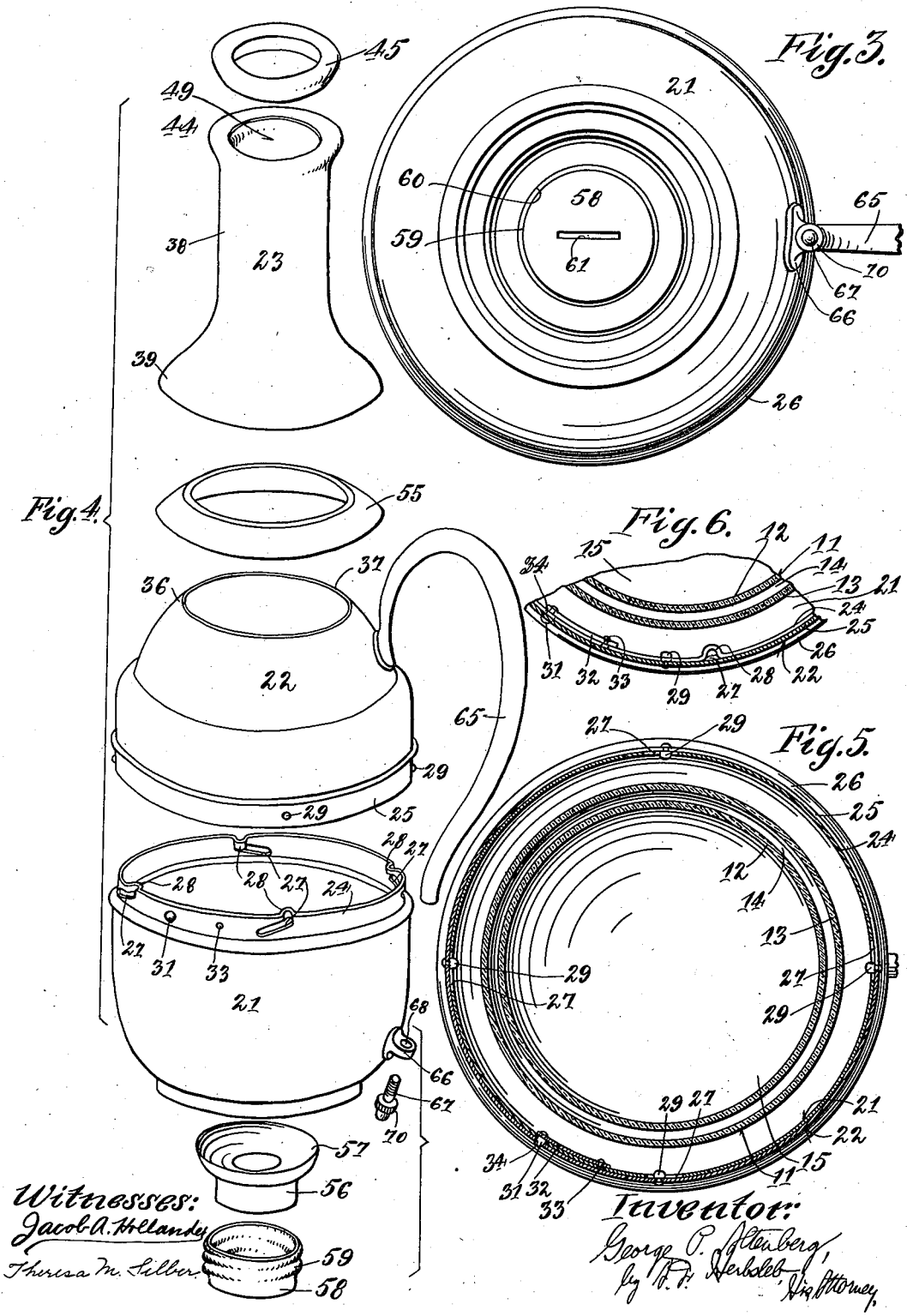

UNITED STATES PATENT OFFICE.

GEORGE P. ALTENBERG, OF CINCINNATI, OHIO, ASSIGNOR TO THE ICY-HOT BOTTLE COMPANY, OF CINCINNATI, OHIO, A CORPORATION OF WEST VIRGINIA.

CARAFE AND CASING THEREFOR.

1,218,036.  Specification of Letters Patent.  Patented Mar. 6, 1917.

Application filed April 8, 1913. Serial No. 759,619.

*To all whom it may concern:*

Be it known that I, GEORGE P. ALTENBERG, a citizen of the United States, residing at Cincinnati, in the county of Hamilton and State of Ohio, have invented certain new and useful Improvements in Carafes and Casings Therefor, of which the following is a specification.

My invention relates to carafes employing a double-walled glass vessel having heat-insulating space between the walls of said vessel, the said vessel being a wide-bodied vessel having a comparatively slender neck. Carafes of this character have heretofore been provided with a casing about the body of the vessel, the glass neck of the vessel extending upwardly unprotectedly from the casing, and exposed to contact with exterior objects liable to break or injure the neck.

It is the object of my invention to so form a casing as to protect the neck. It is a further object of my invention to provide a cushioning means between the mouth-end and the base of the neck of the vessel of the carafe and a casing-part surrounding said neck; further to provide a casing having a body comprising a plurality of body-members and a handle for the casing which has connection with a plurality of said body-members, the body-members having releasable connection with each other; further, to provide a protecting sheath for the neck of the carafe vessel which is distanced from said neck for forming a space between said sheath and neck so that a blow upon said protecting sheath may not communicate directly to the glass, thereby avoiding injury to the glass; further, to provide a casing for a carafe vessel of the character mentioned comprising a wide body-member and a neck-part separable from each other; further, to provide a casing of the character mentioned comprising a wide body-part and a slender neck-part separable at the base of the neck and having a cushion adjacent to the separating joint and the carafe vessel; further, to provide a casing for a carafe vessel of the character mentioned comprising a body-member and a neck-member, the body-member having an inwardly flaring portion which is received over an outwardly flaring base of the neck-member; further, to provide a carafe vessel of the character mentioned having double walls formed with a wide body and with a comparatively slender neck extending therefrom, the mouth of which is formed with an outer face substantially in line with the longitudinal projection of the neck, so that a cushion-member between the neck of the vessel and the neck of a casing may be received around said mouth-end of the neck of the vessel; and further, to provide the neck of a carafe vessel of the character described with a protecting sheath having a bead at its mouth-end projecting outwardly beyond the longitudinal projection of said sheath which receives a cushion-member between the mouth-ends of said neck and sheath; and the invention will be further readily understood from the following description and claims, and from the drawings, in which latter:

Fig. 3 is a bottom view of the same, with the handle partly broken away.

Fig. 4 is a perspective view showing the casing and cushioning parts in separated relations.

Fig. 5 is a cross-section of my improved device taken on a line corresponding to the line 5—5 of Fig. 1; and Fig. 6 is a detail in cross-section on a line corresponding to the line 6—6 of Fig. 1.

Figure 2:
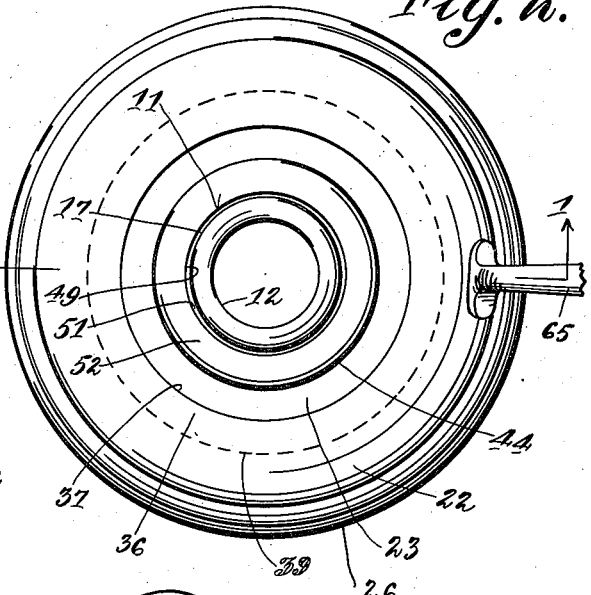
Fig. 2 is a top plan view of my improved device, with the handle partly broken away.

11 represents the vessel or container of the carafe, which is in practice a double-walled glass vessel, comprising an inner wall 12 and an outer wall 13, having a heat-insulating space 14 such as a highly rarefied space between the same, the vessel comprising the wide body-portion 15 and the comparatively long and slender neck-portion 16, suitable separating means being located between the inner and outer walls if desired.

The connection between the inner and outer walls at the mouth-end of the neck is so formed, as by welding, as to form a substantially cylindrical outer end 17 on the neck, that is to say, an outer end which is free to receive a cushioning member thereabout as hereinafter more fully explained.

The casing of my improved device preferably comprises a plurality of wide body-members for surrounding and protecting the body-portion of the carafe vessel and a neck-member which surrounds and protects the neck-portion of the carafe vessel.

This carafe vessel in pratice, is formed of glass, and the neck-portion of the same is especially fragile and liable to damage on account of contact with exterior objects, such for instance, as a drinking glass or cup into which the contents of the carafe may be poured, of striking objects if the carafe is accidentally upset, and being struck by objects, resulting in injury or breakage of the glass neck. For obviating these difficulties I provide my improved device.

The body-members of the casing in the present exemplification consist of a lower body-member 21 and an upper body-member 22. A neck-portion 23 projects upwardly from the upper body-member and is instanced as a separate member.

The connections between the body-members 21 and 22, in the present exemplification, are formed by flanges 24, 25, the flange 24 being shown received within the flange 25 and positioned by a bead 26. The flange 24 is provided with diagonal slots 27 with which bulges 28 in the flange 24 communicate, the bulges and diagonal slots being arranged to receive pins 29 on the flange 25 for drawing the two body-members together. When in connected relation a lock-pin 31, on a spring-strip 32 which is riveted to the flange 24 by a pin 33, is arranged to project outwardly through the flange 24 into a locking hole 34 in the flange 25, thereby locking the body-members in connected relation.

The upper end of the wall of the upper body-member converges inwardly, as shown at 36, and is provided with an opening 37 through which the neck-member 23 extends, the neck-member being provided with a shank 38 and an outwardly flaring base 39. The lower end of the base is received under the upper end of the inwardly converging wall of the upper body-member for forming a releasable joint 40.

The upper end of the neck-member is provided preferably with a hollow outwardly extending bead 44 which serves the function of preventing slippage of the hand from the casing if held by the neck and as a guiding means against a glass or cup into which pouring may be done from the carafe, the outer portion of the bead serving these functions and the inner hollow portion serving as a cavity in which a cushion-member 45, shown as a ring, is received between the upper end of the neck-member of the casing and the upper end of the neck of the vessel.

The mouth-end of the neck of the vessel is so formed preferably, that it may be slipped upwardly through the base of the neck-member and through the cushion-member, with the breast 46 of the vessel located at the base of the neck of the casing, the breast flaring substantially outwardly to correspond with the flare of the base of the neck of the casing. The mouth-end of the neck of the casing is provided with an opening 49 into which the mouth-end of the neck of the vessel preferably extends, the same being shown slightly protruding. This construction allows a water-tight joint between the casing and the mouth of the vessel and at the same time affords protecting means for the mouth of the vessel. There is preferably a slight annular space 51 between the inwardly extending flange 52 of the bead 44 and the mouth of the vessel.

A cushion-member is also preferably placed intermediate between the upper and lower ends of the casing, shown as an annular cushioning ring 55. This cushioning member is preferably located on the breast of the vessel between the vessel and the casing, it being shown at the position of the releasable joint 40.

Figure 1:
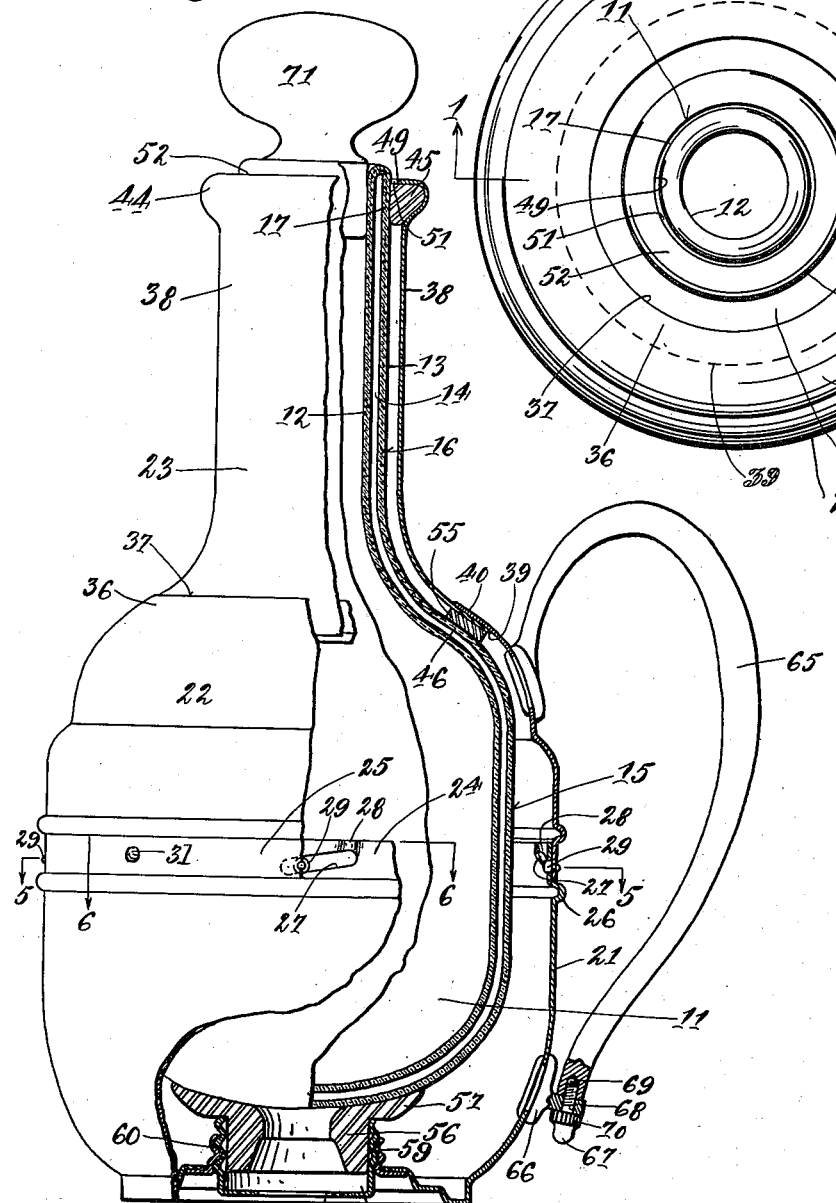
Figure 1 is a side elevation of my improved device partly broken away and partly in axial section on a line corresponding to the line 1—1 of Fig. 2.

I preferably also provide a bottom cushion between the vessel and the casing, instanced as a resilient body 56 having the resilient lip 57 instanced as an annular lip forming a mouth in which the bottom of the vessel is received and is seated, the mouth being arranged to spread (compare Figs. 4 and 1) on pressure between the bottom of the vessel and the bottom of the casing. I have shown this resilient body supported in a shell 58 having a threaded wall 59 coacting with a threaded opening 60 in the bottom of the casing, the shell being provided with a slot 61 into which a turning means, such as a coin or a knife-blade, may be inserted for axially moving the shell and thereby positioning the cushioning body 56 lengthwise of said axis. The releasable connection between the body-members draws the body-members together when connecting said members and causes compression of the cushion-members. The cushioning members 45, 55 and 56 may be of rubber or other suitable material.

If desired, the casing of the carafe may be provided with a handle 65 secured to a plurality of the body-members of the casing and instanced as attached to the upper body-member 22 and having a releasable connection with the lower body-member 21. This releasable connection is shown as accomplished by a lug 66 secured to the lower body-member 21, a clamp-screw 67 extending through a hole 68 in said lug and threaded into a threaded bore 69 in the end of the handle for clamping the lower end of said handle to the lug, the lug being instanced as clamped between the lower end of the handle and the head 70 of said clamp-screw.

The handle spans the body-members of the casing and permits easy pouring from the carafe.

The mouth of the carafe may be closed by a suitable stopper 71.

Having thus fully described my invention, what I claim as new and desire to secure by Letters Patent, is:

1. The combination with a frangible double-walled carafe vessel having a heat-insulating space between the walls thereof and comprising a wide body-portion, a long slender neck-portion and a breast between said last-named portions, a protecting casing for said carafe vessel comprising a wide body-portion and a long slender neck-portion, said body-portion composed of a plurality of wide body-sections, said wide body-sections comprising parts respectively at the top and bottom of said body-portion extending toward the longitudinal axis of said body-portion, a cushion between said breast and top-part, a cushion between the bottom of said carafe vessel and said bottom part, and a cushion between said long slender neck-portions of said carafe vessel and said casing, all said cushions being spaced from the longitudinal axis of said vessel and said first-named cushions located within the cylindrical projection of said body portion of said carafe vessel, said body-sections provided with means for drawing said body-sections toward one another whereby to compress said first-named cushions in the direction of said longitudinal axis and said last-named cushion perpendicular to said axis.

2. The combination with a double walled heat insulated carafe vessel, of a casing therefor comprising a plurality of wide body-members and a neck-member, said wide body-members comprising an upper body-member and a lower body-member having releasable connection therebetween, drawing said body-members toward each other lengthwise of the longitudinal axis of said carafe vessel, said upper body-member having an upper inwardly flaring end, said neck-member having a lower outwardly flaring end of greater diameter than said upper inwardly flaring end of said upper body-member and received under said inwardly flaring end of said body-member, and cushioning means between the said carafe vessel and said lower outwardly flaring end of said neck-member arranged to be compressed in directions lengthwise of said longitudinal axis by said releasable connection.

3. The combination of a double-walled glass vessel having heat-insulating space between the walls of said vessel and formed with a wide body and a long neck, of a casing comprising a wide body-member and a long neck-portion, there being a joint between the upper end of said body-member and the lower end of said neck-portion, and an annularly arranged cushion between said casing and said carafe vessel approximately at said joint, the diameter of said annularly arranged cushion being less than the diameter of said wide body of said vessel, means acting on said joint for compressing said annularly arranged cushion in directions lengthwise of the longitudinal axis of said vessel, and an annularly arranged cushion between the mouth-ends of said neck-portion and said neck of said carafe vessel, said mouth-end of said neck of said carafe vessel received through said last-named annularly arranged cushion whereby said last-named annularly arranged cushion is compressed radially.

4. The combination with a carafe vessel of the character described having a wide body-portion and slender neck-portion, of a casing for said carafe vessel comprising an upper body-member and a lower body-member, releasable connecting means between said body-members, and a handle connecting with both said body-members, said handle releasably connected to one of said body-members.

5. A casing for a carafe vessel of the character described comprising a plurality of body-members, a releasable connection therebetween, and a handle spanning said releasable connection and having connection with each of a pair of said body-members, said handle provided with a releasable connection for permitting separation of said last-named body-members.

6. The combination with a frangible carafe vessel of the character described having a wide body-portion and a slender neck-portion, of a metal casing therefor comprising a wide body-portion and a slender neck-portion, said slender neck-portion of said casing at its mouth end having an outwardly extending annular bead extending outside the longitudinal projection of said slender neck-portion of said casing and forming a lower outwardly extending annular obstructing shoulder and an annular inner cushion-receiving recess of greater diameters than said slender neck-portion of said casing, and a cushion in said recess between the mouth ends of said slender neck-portions, and said slender neck-portion of said casing spaced from said slender neck-portion of said carafe vessel for forming an annular space between said slender neck-portions substantially throughout the lengths of said neck-portions.

7. The combination of a frangible double-walled carafe vessel having a heat-insulating space between the walls of said carafe vessel and comprising a wide body-portion and a long slender neck-portion, a metal casing therefor comprising a wide body-portion and a long slender neck-portion, the top and bottom of said body-portion of said casing extending inwardly respectively above the top and below the bottom of said body-portion of said carafe vessel, and said long slender neck-portion of said casing surrounding said long slender neck-portion of said carafe vessel, an annularly arranged cushion between said tops located between and spaced from the longitudinal projection of said long slender neck-portion of said casing and the longitudinal projection of the wall-portion of greatest diameter of said wide body-portion of said carafe vessel, and a cushion between said bottoms, means for compressing said cushions in directions parallel with the longitudinal axis of said carafe vessel, and an annularly arranged cushion between the outer end-portions of said long slender neck-portions of said carafe vessel and casing, said slender neck-portion of said carafe vessel protruding upwardly through said last-named cushion, and arranged so that said last-named annularly arranged cushion is compressed in a direction substantially perpendicular to said longitudinal axis.

8. The combination with a frangible carafe vessel of the character described having a wide body and a slender neck, of a metal casing therefor comprising a wide body and a slender neck provided respectively with inwardly and outwardly laterally extending proximate end-portions having an annular joint therebetween formed by the proximate laterally extending faces of said end-portions, said annular joint of less diameter than the diameter of said wide body and of greater diameter than the greatest diameter of said slender neck and located within and spaced from the longitudinal projection of the wall-portion of greatest diameter of said carafe vessel and located outside of and spaced from the longitudinal projection of the wall portion of greatest diameter of said neck of said carafe vessel.

9. The combination, with a fragile large-bodied inner container of carafe form having a neck extending from its body and comprising inner and outer walls having a heat-insulating space therebetween, of a casing therefor comprising a plurality of large-bodied body-members having a releasable connection therebetween and a neck-member, the upper end of said connected body-members having a converging wall, said neck-member arranged to be received about and spaced from the neck of said container and having a flaring base received under said converging wall, an annular cushion between said casing and said inner container at the base of said neck, an annular cushion between the lower end of said inner container and the lower end of said connected body-members, means for connecting said body-members compressing said cushions in directions parallel to the longitudinal axis of said container, and an annular cushion between the neck of said inner container and said neck-member of said casing adjacent to the mouth-ends of said neck compressed in directions at right angles to said longitudinal axis, all said annular cushions being of less diameters than the diameter of said body of said inner container, substantially as and for the purpose specified.

In testimony whereof, I have hereunto signed my name in the presence of two subscribing witnesses.

GEORGE P. ALTENBERG.

Witnesses:
  CHARLES E. WEBER,
  THERESA M. SILBER.